G. K. Hyde.
Railroad Switch.
Nº 29,792. Patented Aug. 28, 1860.
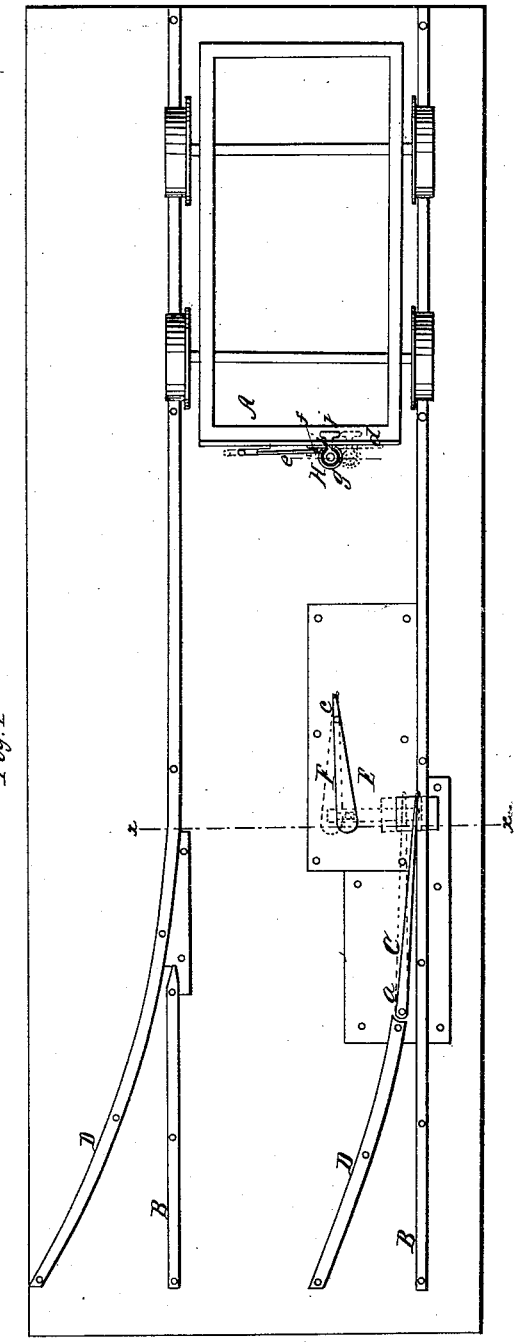
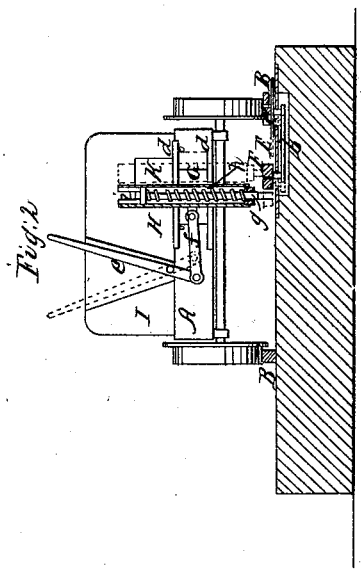
Witnesses
Inventor
Gordian K. Hyde

UNITED STATES PATENT OFFICE.

GORDIAN K. HYDE, OF BROOKLYN, NEW YORK.

OPERATING RAILROAD-SWITCHES.

Specification of Letters Patent No. 29,792, dated August 28, 1860.

*To all whom it may concern:*

Be it known that I, GORDIAN K. HYDE, of Brooklyn, in the county of Kings and State of New York, have invented a new and Improved Means for Operating Railroad-Switches; and I do hereby declare that the following is a full, clear, and exact description of the same, reference being had to the annexed drawings, making a part of this specification, in which—

Figure 1, is a plan or top view of a switch and a car truck showing my invention. Fig. 2, a transverse section of the switch, taken in the line $x$, $x$, Fig. 1.

Similar letters of reference indicate corresponding parts in the figures.

This invention is designed for city and other railroads on which the cars are drawn by animals.

The object of the invention is to place the operating of the switches, under the complete control of the driver.

To enable those skilled in the art to fully understand and construct my invention, I will proceed to describe it.

A, represents a car truck which may be of usual construction, and B, B, are the rails of a track, and C, a switch or movable frog which has its pivot at $a$, and forms a connection between the main rails B, and branch rails D, D.

The bar forming the switch or frog C, has one end of a bar $b$, connected to it near its front end, said bar $b$, being below a plate E, which is on a level with the surface of the ground. The opposite end of bar $b$, is attached to a lever F, which is secured by a fulcrum pin $c$, to the plate E. By moving the lever F, right and left a corresponding movement will be given the switch or frog C, and the latter placed in communication with the main rail B, or thrown out from it as may be desired.

On the end of the car truck A, there is placed a slide G, which is fitted between horizontal guides $d$, $d$, and allowed to move freely between them. This slide may be adjusted or moved back and forth by means of a hand lever $e$, extending up within reach of the hand of the driver.

To the slide G, a vertical cylinder H is attached, and in this cylinder a rod $g$, is fitted, said rod having a spiral spring $h$, around it, which spring has a tendency to keep the rod $g$, elevated sufficiently above the surface of the ground to clear the lever F. The back part of the cylinder H, is slotted vertically as shown at $i$, and a treadle $j$, which is attached to the rod $g$, projects through the slot and is accessible to the foot of the driver, the treadle $j$, passing through an opening $k$, in the guard or apron I, of the truck A.

In cases where the cars are not turned around and the team consequently attached to either end, there is a cylinder and rod at both ends of the car truck.

The operation is as follows: As the car is drawn along and approaches the switch or frog C, the driver, if the switch or frog is to be operated, depresses the rod $g$, by pressing his foot on the treadle $j$, and the rod $g$, will, as the car moves along, actuate the lever F, and consequently the switch or frog C. The switch may be either thrown in connection with the main rail B, or off from it according to which side of the lever F, the rod $g$, is made to pass and the rod $g$, may be made to pass either side of the lever F, by sliding the cylinder H, laterally through the medium of the lever $e$. Thus by this simple arrangement the switch may be operated by the driver with the greatest facility.

The device is simple and may be adopted at a small cost.

I am aware that rods and bars have been attached to cars and locomotives, for operating switches, but so far I am aware none have been attached to a slide so as to render the rods and levers adjustable that they may operate at either side of a lever for moving the switch in either direction as may be desired.

I do not claim therefore separately any of the parts herein described; but,

I do claim as new and desire to secure by Letters Patent;

The combination of the slotted cylinder H, treadle $j$, rod $g$, spring $h$, with the laterally moving slide G, lever $e$, and truck A, as and for the purpose herein shown and described.

GORDIAN K. HYDE.

Witnesses:
 L. W. BENDRÉ,
 M. M. LIVINGSTON.